United States Patent
Tsay

[11] Patent Number: 5,921,503
[45] Date of Patent: Jul. 13, 1999

[54] ASSISTANT LANDING DEVICE OF A TROUBLED AIRPLANE

[76] Inventor: Ing-Lang Tsay, P.O. Box 10780, Taipei, Taiwan

[21] Appl. No.: 09/018,619

[22] Filed: Feb. 4, 1998

[51] Int. Cl.$^6$ .............................. B64D 25/00; B64D 17/64
[52] U.S. Cl. ............................................. 244/139; 244/147
[58] Field of Search ................................... 244/107, 139, 244/140, 147, 146

[56] References Cited

U.S. PATENT DOCUMENTS

| | | | |
|---|---|---|---|
| 1,556,502 | 10/1925 | Doucett ................................... | 244/139 |
| 1,849,970 | 3/1932 | Barber ..................................... | 244/139 |
| 2,702,679 | 2/1955 | Culver ..................................... | 244/139 |
| 3,352,519 | 11/1967 | Hibi ........................................ | 244/139 |
| 3,395,881 | 8/1968 | Markham et al. ....................... | 244/139 |
| 4,480,807 | 11/1984 | Bowen ................................... | 244/139 |

*Primary Examiner*—Galen L. Barefoot

[57] ABSTRACT

The assistant landing device of a troubled airplane of the present invention comprises a storing chamber under the front end of the airplane, which has a freely opened door, and a strengthen network the front end of which is connected with the airplane body. When the network is expanded from the storing chamber, it will not affect the descent of the front and back landing gears. A plurality of canopy packets arranged as an array are installed on the front and back sides of the network and may be opened by controlling so that a group of canopy packets are formed on the right and left sides of the body of the airplane so that the airplane may be descended slowly. Each of the canopy packets has a large and a small canopy packets and a gas container for being quickly charged with air so that the small canopy packet may be opened. A plurality of positioning parachutes are located on the distal end of the network, which may be opened by the applied force of the wind in order that the strengthen network will be expanded uniformly below the canopy body. The present invention has further provided a network cover the end portion of which has a decoupled parachute being controlled to expand in order that the network cover can be decoupled from the network.

12 Claims, 5 Drawing Sheets

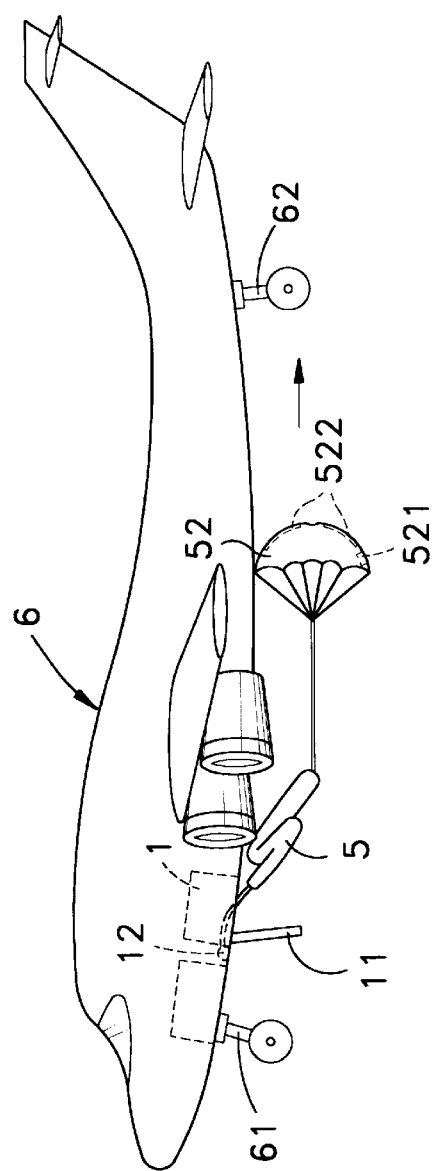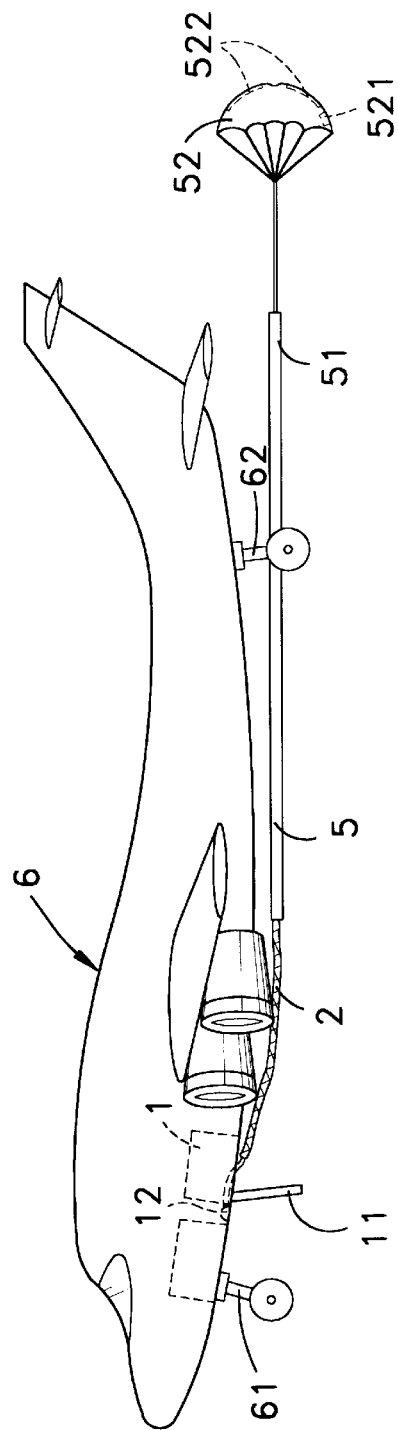

ASSISTANT LANDING DEVICE OF A TROUBLED AIRPLANE

BACKGROUND OF THE INVENTION

1. Field of the Invention

The present invention relates to an assistant landing device of a troubled airplane, especially to an assistant landing device of an airplane with a canopy packets group.

2. Description of the Prior Art

It is needless to say that the airplane is one of the most convenient and the quickest traffic vehicles, but on the other hand, it is also a highly dangerous one when flying in the air. Once an airplane loses power or can not fly normally due to faults, it will become very weak. Recently, the airplane manufacturers have made their efforts to improve the security of airplanes. When a fault is occurred so that the airplane may not be landed successfully, it is necessary to effectively assist the airplane to descend with safety. As long as a trouble airplane does not explode in the air, there is still a possibility to assist the airplane to land with very low danger. One of the preferred methods is to assist the airplane to land by the assistance of a canopy packet group. However, how to use the canopy packet group to assist the airplane to land successfully is a question which may not be solved by general device. For example, the U.S. Pat. Nos. 1,705,909; 4,105,173; 4,562,981; 4,634,080; and 5,028,018 and French Patent Application Nos. 1,064,014; 1,129,226; etc. Those disclosed in said Patent Applications could not be used directly to assist a trouble airplane to land successfully. However, if there are a plurality of canopy packets distributed on the two sides of an airplane, it is probably to slowly land an airplane by the plurality of uniformly distributed canopy packets group. This relates how to arrange the canopy packet group and how to control the expansion of the canopy packets effectively.

SUMMARY OF THE INVENTION

Accordingly, the main object of the present invention is to provide an assistant landing device of a troubled airplane, wherein a plurality of canopy packets are symmetric distributed on the two sides of a strengthen network.

A second object of the present invention is to provide an inflatable envelop for auxiliary supporting the strengthen network of the canopy packet group to be fully opened under the lower portion of an airplane.

A further object of the present invention is to provide a network cover for preventing the network, when it is descended from the lower portion of an airplane, from being tangled and not able to expand properly; and the network cover is capable of being successfully separated with the network.

The other object of the present invention is to provide a strengthen network shaped into a swallow tail so that as the strengthen network is expanded, it will not affect the descent of the front landing gear and the rear landing gear.

In order to attain these objects, the assistant landing device of a troubled airplane of the present invention comprises a storing chamber under the front end of the airplane, which has a freely opened door, a connector at least, and a strengthen network having a front end connected to the connector. When the network is descended and expanded from the storing chamber, it will not affect the downward and upward movement of the front landing gear and the rear landing gear. And at least an inflatable envelop is connected on the upper edge of the network so that the network may be expanded successfully and attach close to the bottom the lower portion of the airplane. A plurality of canopy packets arranged as an array are installed on the front and back sides of the network. These canopies in the packets are controlled to be opened on the right and left sides of the body of the airplane so that the airplane may be descended slowly. Each of the canopy packets has a large and a small canopy packets as well as a gas container which can be quickly charged with air so that the small canopy packet may be opened. A plurality of positioning parachutes are located on the distal ends of the network to be opened by the applied force of the wind in order that the strengthen network will be expanded uniformly below the canopy body. The present invention has further provided a network cover wherein the end portion of which has a decoupled parachute in order that the network cover can decouple from the network. The decoupled parachute is opened under control.

The present invention will be better understood and its numerous objects and advantages will become apparent to those skilled in the art by referencing to the following drawings in which:

BRIEF DESCRIPTION OF THE DRAWINGS

FIG. 1 is a side schematic view of the assistant landing device in the first embodiment according to the present invention, which shows the position of a storing chamber and the condition that a strengthen network and a canopy packet group are descended form the lower portion of an airplane.

FIG. 2 is a side schematic view showing that the network cover is separated with the network body.

DETAILED DESCRIPTION OF THE PREFERRED EMBODIMENT

Figure 3:
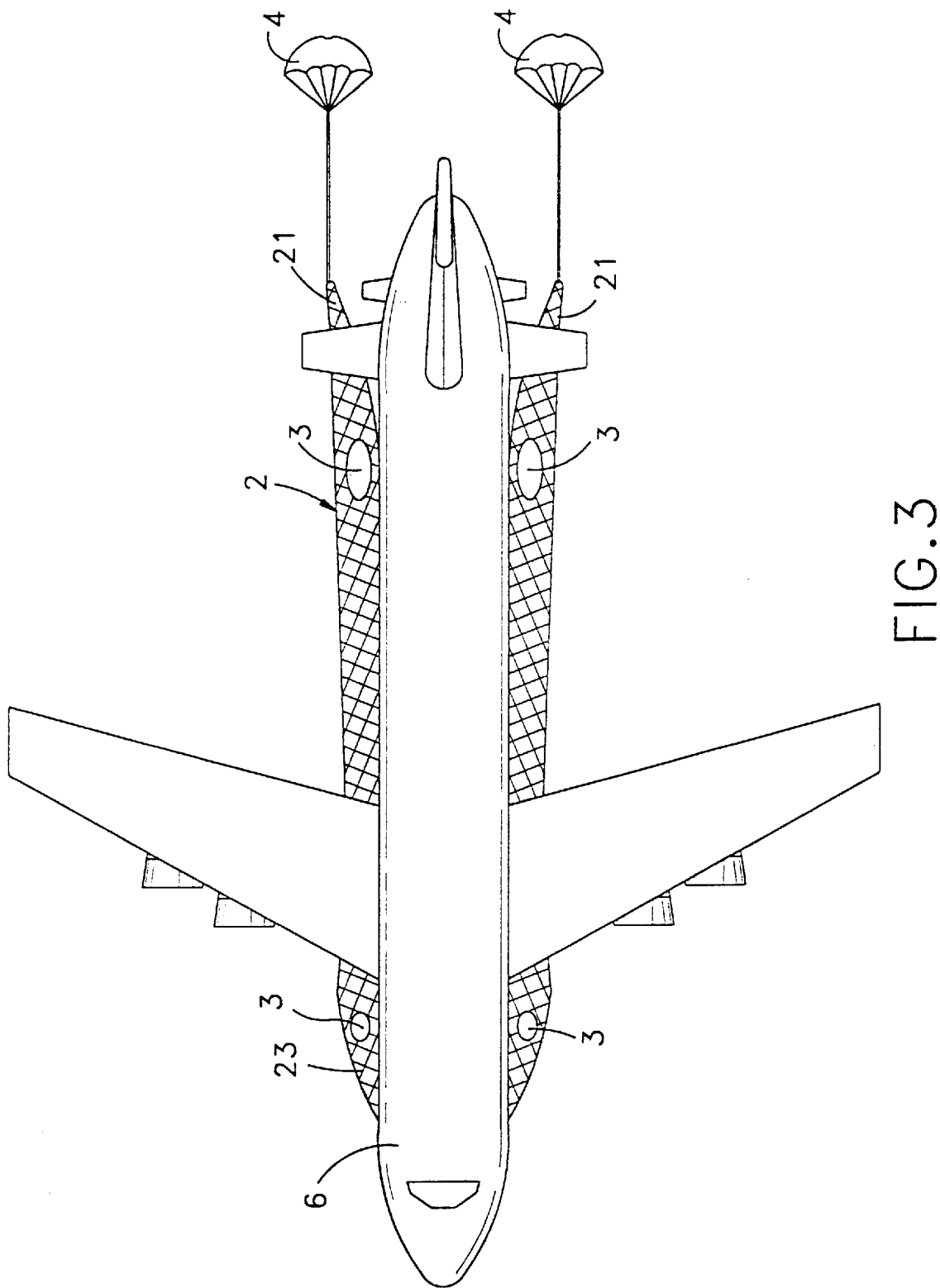
FIG. 3 is an elevational view of the present invention showing a strengthen network which is decoupled with the network cover and uniformly expanded under the body of an airplane by the positioning parachute on the end thereof.
Figure 4:
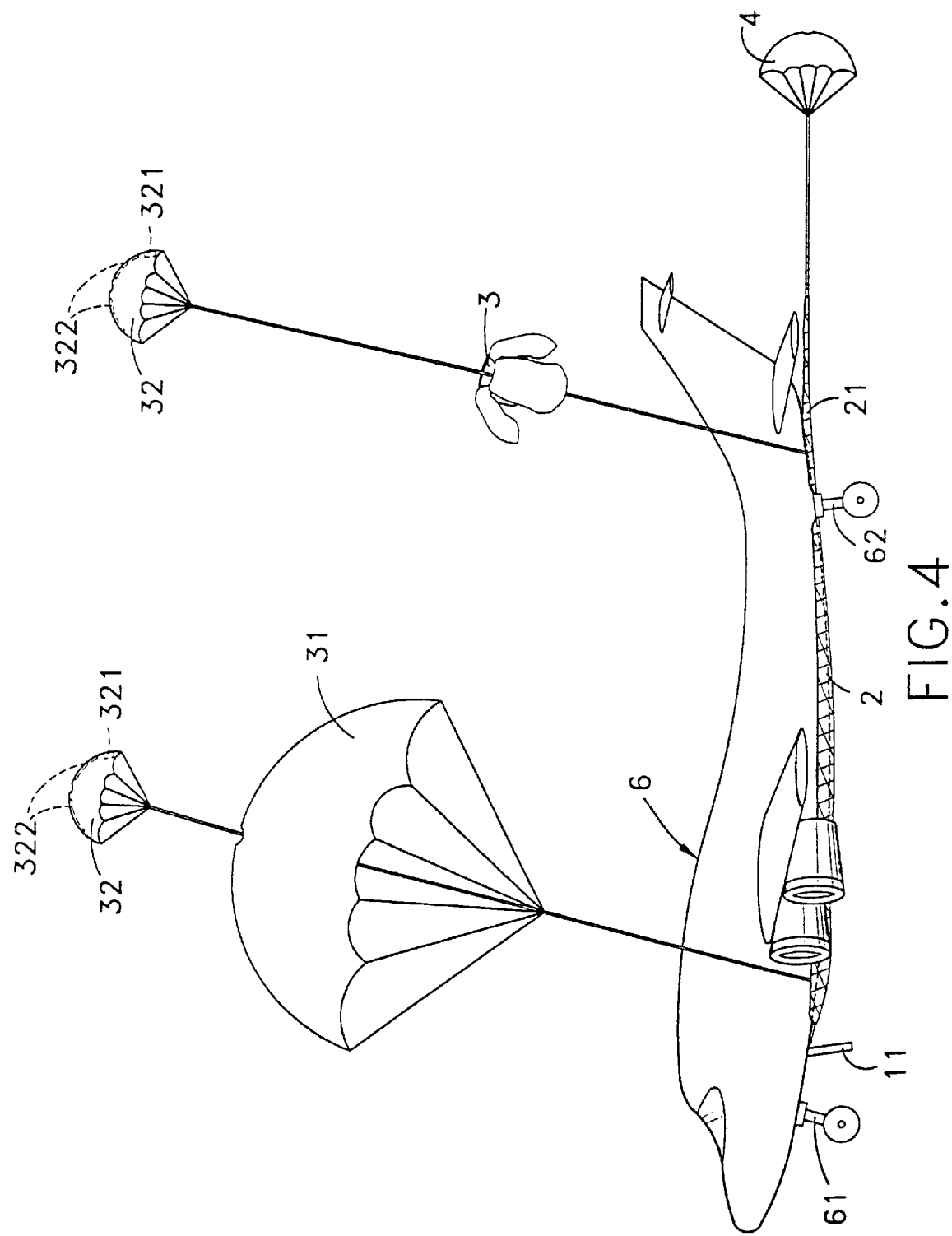
FIG. 4 is a side schematic view showing that the canopy packets on the strengthen network have been opened sequentially.
Figure 5:
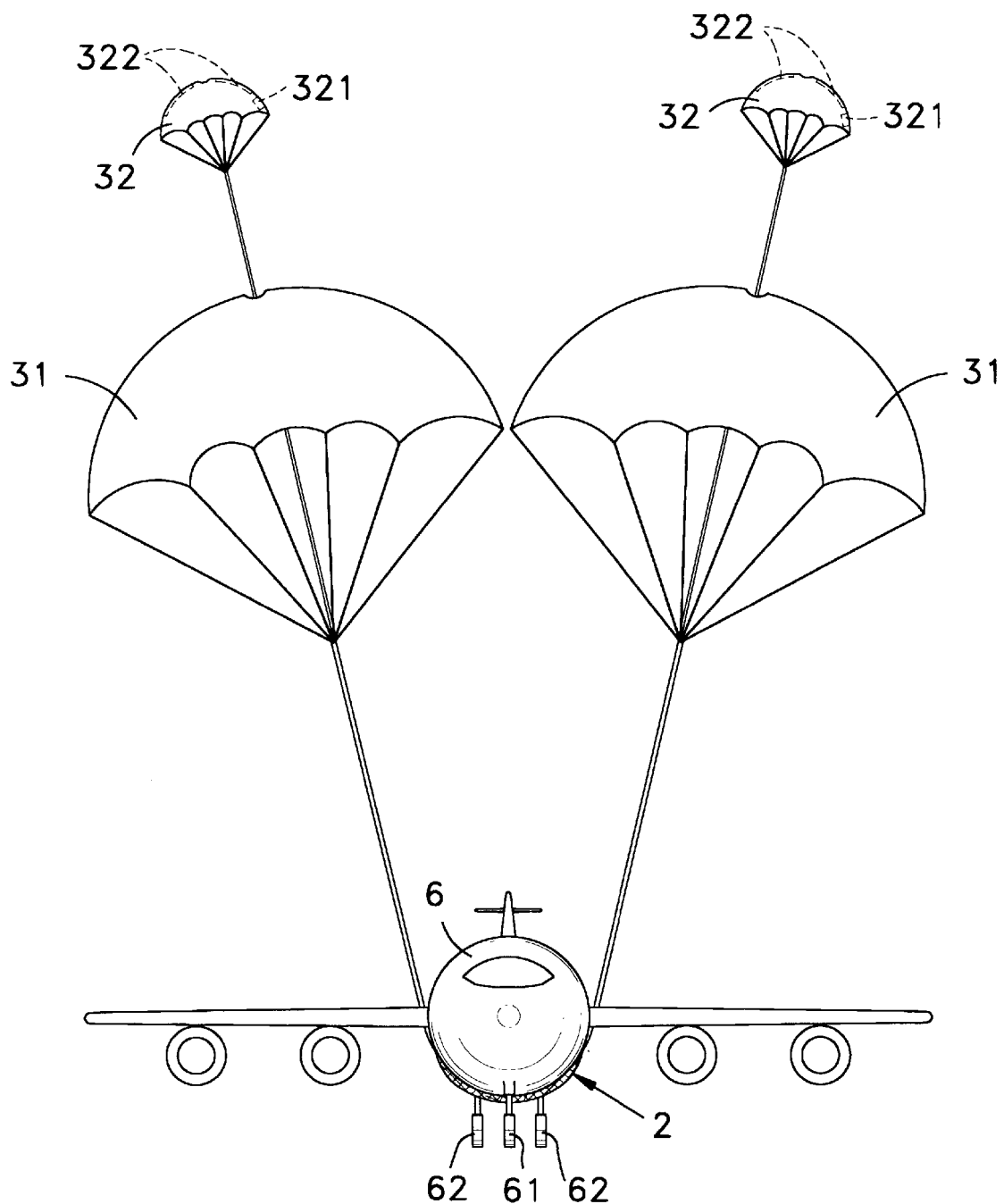
FIG. 5 is a front view of the present invention showing that all of the canopy packets have been fully expanded and distributed on the left and right sides of the airplane.
Figure 7:
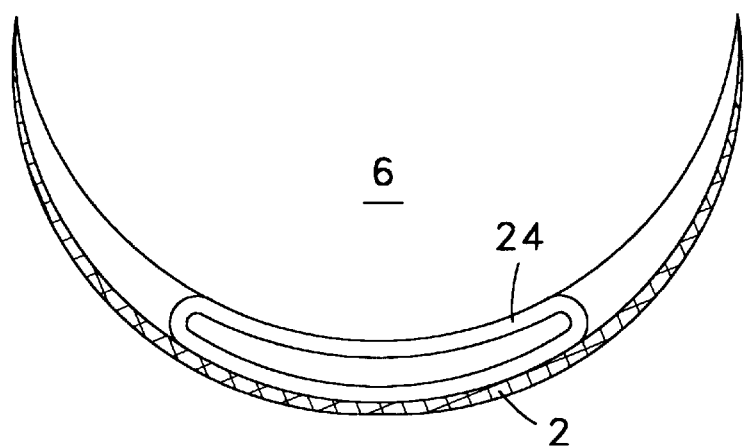
FIG. 7 is a partially enlarged view of FIG. 5.

As shown in FIGS. 1, 2 and 3, in the present invention, an canopy packet means is received within the storing chamber (1) on the lower portion of the front end of an airplane. The canopy packet means, as shown in FIG. 3, has a strengthen network (2), a plurality of canopy packets (3) arranged as an array and connected on the left and right sides of the strengthen network (2), positioning parachutes (4) connected on two sides of each distal end (21) of the network (2), and a network cover (5) the distal end (51) of which has a decoupling parachute (52) for assisting the network cover (5) to decouple with the strengthen network (2). The storing chamber has a door (11) opened freely inside of which has preferably a connector (12) at least for being connected with the front end of said strengthen network (2). As shown in FIG. 7, it is preferred that on the strengthen network (2), for example, the upper face thereof is further connected with at least a soft air bag (24) for assisting the strengthen network to be spanned out and attach close to the middle portion of the airplane so that the canopy packets (3) may be retained on the two sides of the central line of the airplane. When the network has left the storing chamber and landed, as shown in FIG. 2, the canopy cover (5) enclosing on the periphery of the strengthen network (2), and the decoupled parachute (52) of the distal end thereof will expand by wind, and then pull the canopy cover (5) to leave the canopy packet means. If it is desired to speed the expansion of the decoupled parachute (52), a gas container (521) connected with the decoupled parachute (52) is installed to charge air into the flexible inflatable envelop tube (522) inside and outside the decoupled parachute (52). The design of the inflatable envelop tube adhered on the surface of the decoupled parachute (52) and the positioning parachutes (4) and the charging method of the same may be referenced to U.S. Pat. No. 5,161,755, assigned to the inventor of the present invention. The strengthen network (2) separated with the network cover (5) will be expanded by the applied force of the wind according to the plurality of positioning parachutes (4) on the distal ends (21) of the strengthen network (2) and then it is fully supported and opened, as shown in FIG. 3, since the strengthen network (2) is designed as a special swallowtail, thus as the strengthen network (2) is expanded below the airplane, it will not affect the upward and downward movement of the rear landing gear (62). As shown in FIGS. 4 and 5, each of the canopy packets (3) may be controlled to be opened. Groups of canopy are installed on the left and right sides of the body of the airplane so that the airplane may be landed slowly. It is preferred that each canopy packet includes a large canopy (31) and a small canopy (32), and each small canopy has an inflatable envelop tube (322) as described in said U.S. Pat. No. 5,161,755 of the inventor of the present invention and a gas container (321) corresponding to the small canopy (32). The releasing of the compressing air within the gas container (321) is electrically controlled so that each of the small canopy (32) may be charged with air quickly before the large canopy (31) is fully opened.

Figure 6:
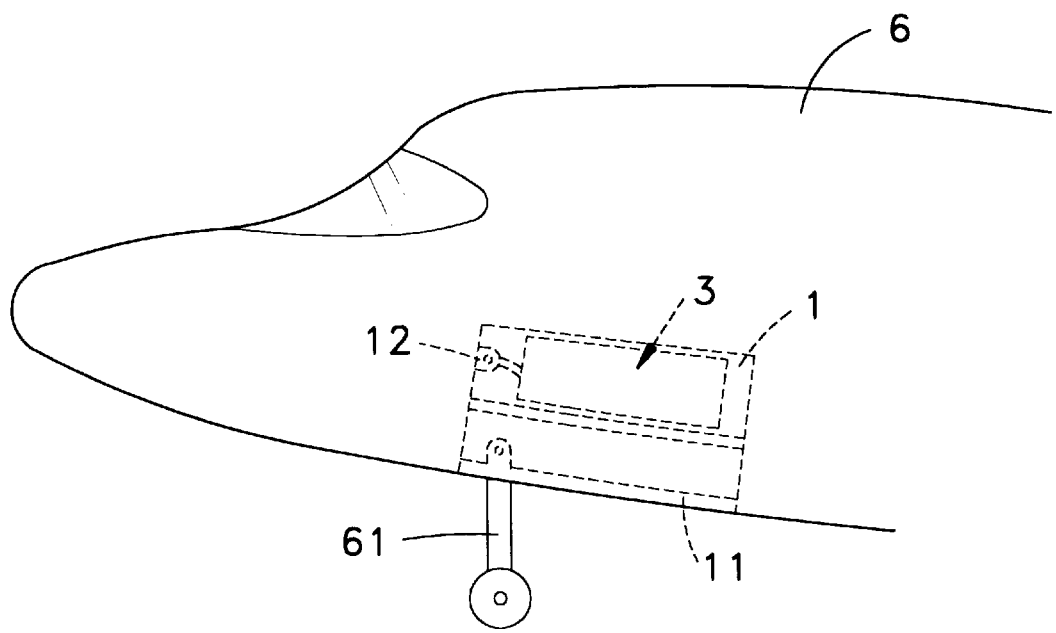
FIG. 6 shows another embodiment of the position of the storing chamber in the present invention, in which the storing chamber is located exactly above the receiving chamber of the front landing gear of the airplane.

The installed position of the storing chamber is preferably not over that of the front landing gear (61), for example, it is installed behind the storing chamber of the front landing gear (61), or as shown in FIG. 6, it is installed above the storing chamber of the front landing gear (61). When the storing chamber (1) is installed above the front landing gear (61), the door (11) of the storing chamber (1) is opened after the front landing gear (61) has been descended. In the gas container, an electric signal is used to move the driver fast so to penetrating through a diaphragm, thus the air within the air chamber will be released. The embodiment of the electric signal may employ the radio frequency control technology in wireless communication. For example, a frequency switch controlled by frequency may be installed on the gas containers (321) and (521), or a wired circuit may be used to transfer a current of an electric signal to the gas containers (321) and (521) on the controlled terminal.

Further, since the array is installed on all the canopy packets (3) located on the left and right sides of the strengthen network (2) of the embodiment according to the present invention, it is preferred that these canopy packets are symmetrically connected with the strengthen network (2) with spaces therebetween so that after each of the canopy packet is opened, it may be assistantly pulled a troubled airplane, thus the airplane may be prevented from falling quickly.

Although certain preferred embodiments of the present invention have been shown and described in details, it should be understood that various changes and modification may be made therein without departing from the scope of the appended claims.

What is claimed is:

1. An assistant landing device of a troubled airplane comprising:

a storing chamber installed below a lower portion of a front body of an airplane, and the storing chamber having a door which may be opened freely;

a canopy packet means received within said storing chamber including:

a strengthen network which having a front end and two distal ends, the front end of which is connected with said storing chamber, said network is expandable and then attached close onto the lower portion of the airplane from the front body to the back of the airplane;

a plurality of canopy packets arranged as an array and connected on the strengthen network and each of the canopy packets has a plurality of canopies; and positioning parachute means connected on two sides of each distal end of the strengthen network.

2. The assistant landing device of a troubled airplane as recited in claim 1, wherein the canopy packet means is enclosed by a network cover, and a distal end of the network cover has a decoupling parachute which is controlled to be opened for assisting the network cover to decouple with the canopy packet means.

3. The assistant landing device of a troubled airplane as recited in claim 1, wherein at least one canopy is included within each of said canopy packet, and the canopy has an inflatable envelop tube fixed on the canopy for assisting to open the canopy, and a gas container which is used to quickly charge air into said inflatable envelop tube.

4. The assistant landing device of a troubled airplane as recited in claim 1, wherein a connector is located within the storing chamber for being connected with the front end of said strengthen network.

5. The assistant landing device of a troubled airplane as recited in claim 1, wherein an inflatable envelop is installed on the strengthen network for assisting the network to fully open.

6. The assistant landing device of a troubled airplane as recited in claim 1, wherein said positioning parachute has an inflatable envelop tube for assisting the canopy to fully open and a gas container for quickly charging air into the inflatable envelop tube.

7. The assistant landing device of a troubled airplane as recited in claim 3, wherein the gas container is actuated by an electric signal.

8. The assistant landing device of a troubled airplane as recited in claim 6, wherein the gas container for quickly charging air into the decoupled parachute is actuated by an electric signal.

9. The assistant landing device of a troubled airplane as recited in claim 1, wherein said storing chamber is installed on a rear end of a front landing gear of an airplane.

10. The assistant landing device of a troubled airplane as recited in claim 1, wherein the strengthen network is shaped like a swallowtail.

11. The assistant landing device of a troubled airplane as recited in claim 1, wherein said plurality of canopy packets connected with said strengthen network are symmetric distributed on two sides of the strengthen network.

12. The assistant landing device of a troubled airplane as recited in claim 1, wherein said storing chamber is installed above a receiving chamber of the front landing gear.

* * * * *